UNITED STATES PATENT OFFICE.

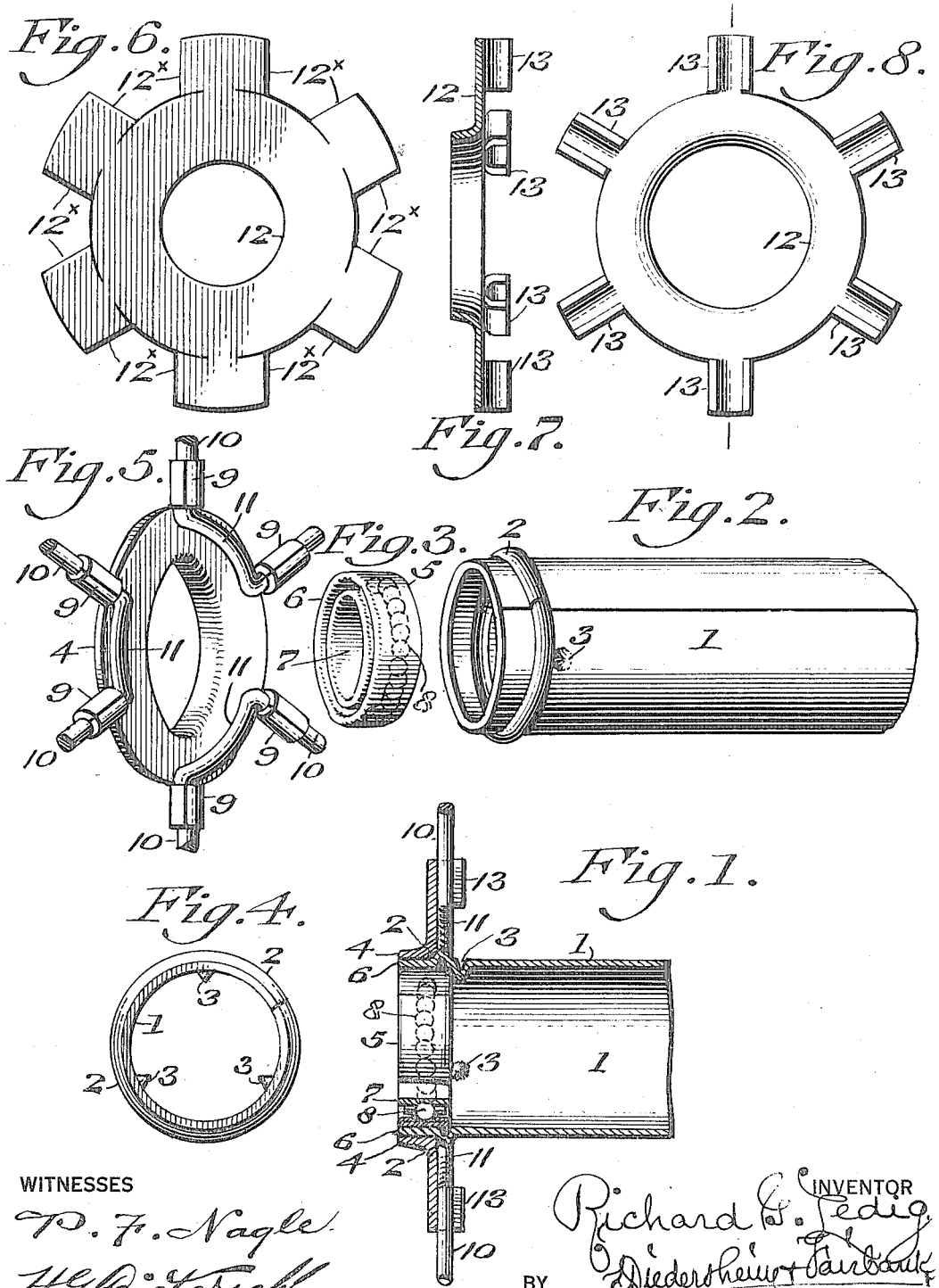

RICHARD G. LEDIG, OF PHILADELPHIA, PENNSYLVANIA, ASSIGNOR TO A. MECKY CO., OF PHILADELPHIA, PENNSYLVANIA, A CORPORATION OF PENNSYLVANIA.

BALL-BEARING WHEEL-HUB.

1,164,292.

Specification of Letters Patent.

Patented Dec. 14, 1915.

Application filed October 26, 1914. Serial No. 868,592.

*To all whom it may concern:*

Be it known that I, RICHARD G. LEDIG, a citizen of the United States, residing in the city and county of Philadelphia, State of Pennsylvania, have invented a new and useful Ball-Bearing Wheel-Hub, of which the following is a specification.

My invention consists of an improvement in a ball bearing hub which is composed of a barrel or hub proper, flanges, spokes and ball bearings, said hub being provided with means on its exterior for positioning said flanges thereon, and on its interior for positioning said ball bearings therein.

It consists further of novel means for connecting the spokes with the flanges.

The invention is satisfactorily illustrated in the accompanying drawing, but the important instrumentalities thereof may be varied, and so it is to be understood that the invention is not limited to the specific details shown and described.

Figure 1 represents a longitudinal section of a ball-bearing hub embodying my invention. Fig. 2 represents a perspective view of the hub proper. Fig. 3 represents a perspective view of the ball bearings proper. Fig. 4 represents an end view of the hub proper. Fig. 5 represents a perspective view of one of the flanges of the device, and portions of the wheel-spokes connected therewith. Fig. 6 represents a blank from which the flanges are produced. Fig. 7 represents a diametrical section of one of the flanges in partially finished condition. Fig. 8 represents an elevation thereof.

Similar numerals of reference indicate corresponding parts in the figures.

Referring to the drawings, 1 designates a barrel or hub proper formed of a sleeve of sheet metal on the exterior of which near the outer end thereof is the out-turned rib or bead 2, and back of the same are at intervals the inturned studs 3. Fitted tightly on an end of the hub is the annular flange member 4 which is adapted to abut against the bead 2, thus positioning said flange on the hub. Within said hub at the ends thereof are the ball bearings 5 which are composed of the concentric casings 6, and 7, and the balls 8 between the same, the inner end of the casing 6 being adapted to abut against the studs 3, thus positioning the ball bearings in said hub. The outer casing 6 of the ball bearings 5 are held tightly in contact with the interior of the hub member or thimble 1, so as to rotate therewith, with the advantages of the balls between said inner and outer casings, it being evident that the flange member 4 which carries the spokes 10 rotates with the hub or thimble 1 as it is tightly connected with the latter as has been stated.

The flange member 4 has on its periphery the ears 9 which project radially from said periphery at intervals thereof so as to be exterior of said periphery, they having clamped to them the spokes 10 of the wheel, which are in pairs united at their inner ends by the bars or arms 11 which extend integrally from one arm to the other and rest against the inner face of the peripheral portion of the flange close to the edge of said portion thus reducing the length of each of the numerous spokes employed, thus effecting considerable saving of material to that extent, and consequent reduction of expense in the manufacture of the hub. The flange member is formed of an annular piece 12 of sheet metal with flat members $12^x$ projecting radially from the periphery thereof, partly slit from said periphery and partly connected with the latter, as in Fig. 6. These members $12^x$ are then bent into the form of semi-cylindrical members 13, as in Figs. 7 and 8, when the inner ends of the spokes 10 are placed within the members 13, and the arms against the inner face of the flange 4, the members 13 then being closed together producing the ears 9 which thus embrace the spokes 10, as in Fig. 5, tightly clamping the same, and connecting them firmly at their inner ends with the flanges, it being understood that the outer ends of the spokes are riveted or otherwise secured to the rim of the wheel as usual.

It will be evident that the axle of the wheel is passed through the hub and the inner casing of the ball bearings and thus the wheel is adapted to run with ease and reduced friction, while the connection of the spokes with the flanges, that of the latter with the hub, and that of the ball bearings with the hub produce a strong, durable, simple, inexpensive and practical construction for the purpose intended.

It will be noticed that the knurl or bead 2 and the studs 3 are struck-up, swaged, or pressed into shape from the material of the hub proper, and so are jointless with said material, and they form shoulders for positioning the flange member 4, and the casing of the ball bearing member 5, whereby said members 5 and 4 retain their adjusted places on and in the hub proper, and are prevented from shifting inwardly on the latter, the flange being driven forcibly over the hub proper or barrel, and the ball bearing being driven forcibly into said hub proper or barrel, and so prevented from outward displacement. The connecting bar of a pair of spokes is close to the periphery of the flange member and so does not interfere with the fitting of said member close to the outwardly projecting shoulder 2 on the exterior of the hub 1.

Having thus described my invention what I claim as new and desire to secure by Letters Patent, is:—

A hub, a flange member on said hub, ears on said flange member radiating from the peripheral edge thereof and extending beyond the same and being partly connected with said edge and partly disconnected therefrom, spokes in pairs embraced by the opposite sections of said ears beyond said periphery, and a bar connecting the members of said pairs of ears resting on said flange member adjacent to the periphery thereof.

RICHARD G. LEDIG.

Witnesses:
 JOHN A. WIEDERSHEIM,
 N. BUSSINGER.